US012490665B2

(12) United States Patent
McGregor et al.

(10) Patent No.: US 12,490,665 B2
(45) Date of Patent: Dec. 9, 2025

(54) STEERING SLOP COMPENSATION SYSTEM FOR AN AGRICULTURAL VEHICLE

(71) Applicant: CNH Industrial America LLC, New Holland, PA (US)

(72) Inventors: Scott McGregor, Chicago, IL (US); Aditya Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 147 days.

(21) Appl. No.: 18/467,452

(22) Filed: Sep. 14, 2023

(65) Prior Publication Data
US 2025/0089593 A1 Mar. 20, 2025

(51) Int. Cl.
*A01B 69/04* (2006.01)
*G05D 1/00* (2024.01)

(52) U.S. Cl.
CPC ......... *A01B 69/008* (2013.01); *G05D 1/0212* (2013.01)

(58) Field of Classification Search
USPC .......................................................... 701/50
See application file for complete search history.

(56) References Cited

U.S. PATENT DOCUMENTS

| 10,188,021 | B2* | 1/2019 | Foster | A01B 69/008 |
|---|---|---|---|---|
| 2010/0084147 | A1* | 4/2010 | Aral | G05D 1/021 |
| | | | | 172/7 |
| 2010/0324772 | A1* | 12/2010 | Aral | A01B 69/004 |
| | | | | 701/25 |
| 2014/0025260 | A1* | 1/2014 | McClure | B62D 1/286 |
| | | | | 701/41 |
| 2017/0308091 | A1* | 10/2017 | Bunderson | B60W 10/04 |
| 2017/0355398 | A1* | 12/2017 | Dix | B62D 15/025 |
| 2018/0364739 | A1* | 12/2018 | Foster | G05D 1/0268 |
| 2020/0001920 | A1* | 1/2020 | Hejase | B60W 30/18036 |
| 2020/0029490 | A1* | 1/2020 | Bertucci | A01B 79/005 |
| 2020/0296878 | A1* | 9/2020 | Dix | A01B 69/008 |
| 2021/0267115 | A1* | 9/2021 | Fjelstad | A01B 69/008 |
| 2021/0405644 | A1* | 12/2021 | Berridge | G05D 1/0223 |
| 2022/0124957 | A1* | 4/2022 | Singh | A01B 79/005 |
| 2022/0167543 | A1* | 6/2022 | Bast | G05D 1/65 |
| 2022/0187832 | A1* | 6/2022 | Weidenbach | G01S 17/88 |
| 2022/0287218 | A1* | 9/2022 | Yuasa | G05D 1/648 |
| 2024/0004397 | A1* | 1/2024 | Rupp | G05D 1/617 |

(Continued)

FOREIGN PATENT DOCUMENTS

| CN | 109080699 | A | * | 12/2018 | ........... | B62D 11/005 |
| EP | 3729935 | A1 | * | 10/2020 | ............. | G05D 1/648 |
| EP | 4218379 | A1 | * | 8/2023 | ............. | G05D 1/648 |

(Continued)

*Primary Examiner* — Atul Trivedi
(74) *Attorney, Agent, or Firm* — Foley & Lardner LLP

(57) ABSTRACT

An agricultural vehicle includes a steering system configured to operate to steer the agricultural vehicle to perform a turn. The agricultural vehicle includes processing circuitry. The processing circuitry is configured to obtain an input indicating a specific turn to be performed by the steering system. The processing circuitry is configured to control the steering system of the agricultural vehicle to implement the specific turn based on the input and a model of the steering system of the agricultural vehicle while accounting for a time delay of the steering system due to slop of the steering system.

20 Claims, 10 Drawing Sheets

(56) References Cited

U.S. PATENT DOCUMENTS

| | | | |
|---|---|---|---|
| 2024/0028048 A1* | 1/2024 | Rust | G05D 1/6985 |
| 2024/0049616 A1* | 2/2024 | Torzewski | G05D 1/648 |

FOREIGN PATENT DOCUMENTS

| | | | | |
|---|---|---|---|---|
| JP | 2022019733 A * | 1/2022 | | |
| KR | 20190141591 A * | 12/2019 | | A01D 69/08 |
| WO | WO-2020044726 A1 * | 3/2020 | | G05D 1/648 |
| WO | WO-2020125839 A1 * | 6/2020 | | H04L 9/50 |
| WO | WO-2021006322 A1 * | 1/2021 | | A01B 69/008 |
| WO | WO-2021025108 A1 * | 2/2021 | | G05D 1/648 |
| WO | WO-2022149408 A1 * | 7/2022 | | A01C 11/02 |
| WO | WO-2023097294 A1 * | 6/2023 | | G06V 20/56 |

* cited by examiner

STEERING SLOP COMPENSATION SYSTEM FOR AN AGRICULTURAL VEHICLE

BACKGROUND

The present disclosure relates generally to an agricultural vehicle. More specifically, the present disclosure relates to a steering control system for agricultural vehicles.

SUMMARY

One implementation of the present disclosure is an agricultural vehicle, according to some embodiments. In some embodiments, the agricultural vehicle includes a steering system configured to operate to steer the agricultural vehicle to perform a turn. In some embodiments, the agricultural vehicle includes processing circuitry. In some embodiments, the processing circuitry is configured to obtain an input indicating a specific turn to be performed by the steering system. In some embodiments, the processing circuitry is configured to control the steering system of the agricultural vehicle to implement the specific turn based on the input and a model of the steering system of the agricultural vehicle while accounting for a time delay of the steering system due to slop of the steering system.

In some embodiments, controlling the steering system of the agricultural vehicle includes using a Smith Predictor that includes the model of the steering system and an estimation of the time delay of the steering system to generate controls for the steering system. In some embodiments, the model of the steering system and an estimation of the time delay of the steering system are both vehicle-specific for the agricultural vehicle. In some embodiments, the estimation of the time delay of the steering system is used to control the steering system such that the time delay of the steering system is accounted for.

In some embodiments, the input includes a commanded curvature of the agricultural vehicle or a steering wheel adjustment of a steering wheel of the steering system. In some embodiments, the input is received from a remote control system and the agricultural vehicle is an unmanned or autonomously controlled agricultural vehicle.

In some embodiments, the time delay of the steering system is accounted for by using an estimated time delay of the steering system of the agricultural vehicle. In some embodiments, the estimated time delay of the steering system of the agricultural vehicle is generated based on a recursive regression between a true response curvature of the agricultural vehicle and a predicted response curvature of the agricultural vehicle output by the model. In some embodiments, the model of the steering system of the agricultural vehicle is generated based on time series data of a curvature of the agricultural vehicle, a yaw rate of the agricultural vehicle, a commanded curvature of the agricultural vehicle, and a forward velocity of the agricultural vehicle. In some embodiments, the steering system includes an electric steering system configured to be operated by the processing circuitry to turn a steering wheel of the steering system.

Another implementation of the present disclosure is a control system for an agricultural vehicle, according to some embodiments. In some embodiments, the control system includes processing circuitry. In some embodiments, the processing circuitry is configured to obtain an input indicating a specific turn to be performed by a steering system of the agricultural vehicle. In some embodiments, the processing circuitry is configured to control the steering system of the agricultural vehicle to implement the specific turn based on the input and a model of the steering system of the agricultural vehicle while accounting for a time delay of the steering system due to slop of the steering system.

In some embodiments, controlling the steering system of the agricultural vehicle includes using a Smith Predictor that includes the model of the steering system and an estimation of the time delay of the steering system to generate controls for the steering system. In some embodiments, the model of the steering system and an estimation of the time delay of the steering system are both vehicle-specific for the agricultural vehicle. In some embodiments, the estimation of the time delay of the steering system is used to control the steering system such that the time delay of the steering system is accounted for.

In some embodiments, the input includes a commanded curvature of the agricultural vehicle or a steering wheel adjustment of a steering wheel of the steering system. In some embodiments, the input is received from a remote control system and the agricultural vehicle is an unmanned or autonomously controlled agricultural vehicle.

In some embodiments, the time delay of the steering system is accounted for by using an estimated time delay of the steering system of the agricultural vehicle. In some embodiments, the estimated time delay of the steering system of the agricultural vehicle is generated based on a recursive regression between a true response curvature of the agricultural vehicle and a predicted response curvature of the agricultural vehicle output by the model. In some embodiments, the model of the steering system of the agricultural vehicle is generated based on time series data of a curvature of the agricultural vehicle, a yaw rate of the agricultural vehicle, a commanded curvature of the agricultural vehicle, and a forward velocity of the agricultural vehicle. In some embodiments, the steering system includes an electric steering system configured to be operated by the processing circuitry to turn a steering wheel of the steering system.

Another implementation of the present disclosure is a method for controlling a steering system of an agricultural vehicle, according to some embodiments. In some embodiments, the method includes obtaining an input indicating a specific turn to be performed by the steering system of the agricultural vehicle. In some embodiments, the method includes controlling the steering system of the agricultural vehicle to implement the specific turn based on the input and a model of the steering system of the agricultural vehicle while accounting for a time delay of the steering system due to slop of the steering system.

In some embodiments, controlling the steering system of the agricultural vehicle includes using a Smith Predictor that includes the model of the steering system and an estimation of the time delay of the steering system to generate controls for the steering system. In some embodiments, the model of the steering system and an estimation of the time delay of the steering system are both vehicle-specific for the agricultural vehicle. In some embodiments, the estimation of the time delay of the steering system is used to control the steering system such that the time delay of the steering system is accounted for.

In some embodiments, the input includes a commanded curvature of the agricultural vehicle or a steering wheel adjustment of a steering wheel of the steering system. In some embodiments, the input is received from a remote control system and the agricultural vehicle is an unmanned or autonomously controlled agricultural vehicle.

In some embodiments, the time delay of the steering system is accounted for by using an estimated time delay of the steering system of the agricultural vehicle. In some embodiments, the estimated time delay of the steering system of the agricultural vehicle is generated based on a recursive regression between a true response curvature of the agricultural vehicle and a predicted response curvature of the agricultural vehicle output by the model. In some embodiments, the model of the steering system of the agricultural vehicle is generated based on time series data of a curvature of the agricultural vehicle, a yaw rate of the agricultural vehicle, a commanded curvature of the agricultural vehicle, and a forward velocity of the agricultural vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
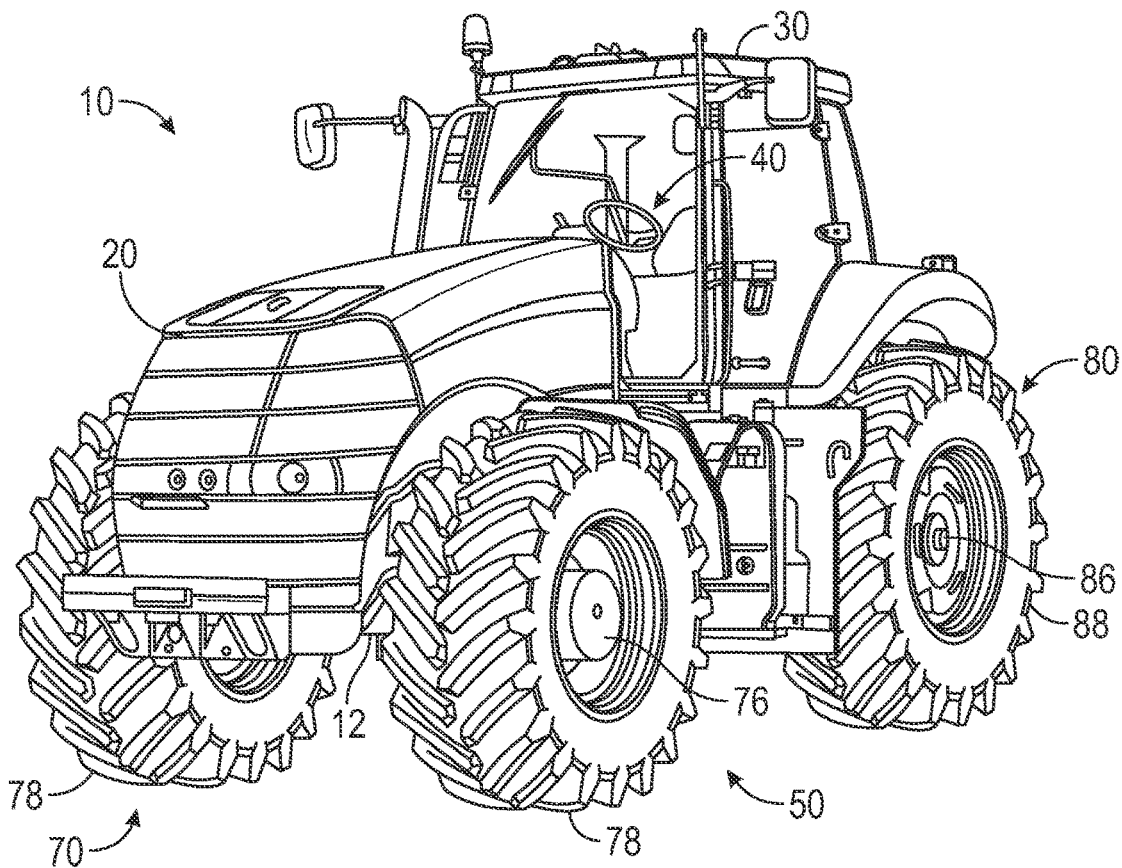
FIG. 1 is a perspective view of a vehicle, according to an exemplary embodiment.
Figure 2:
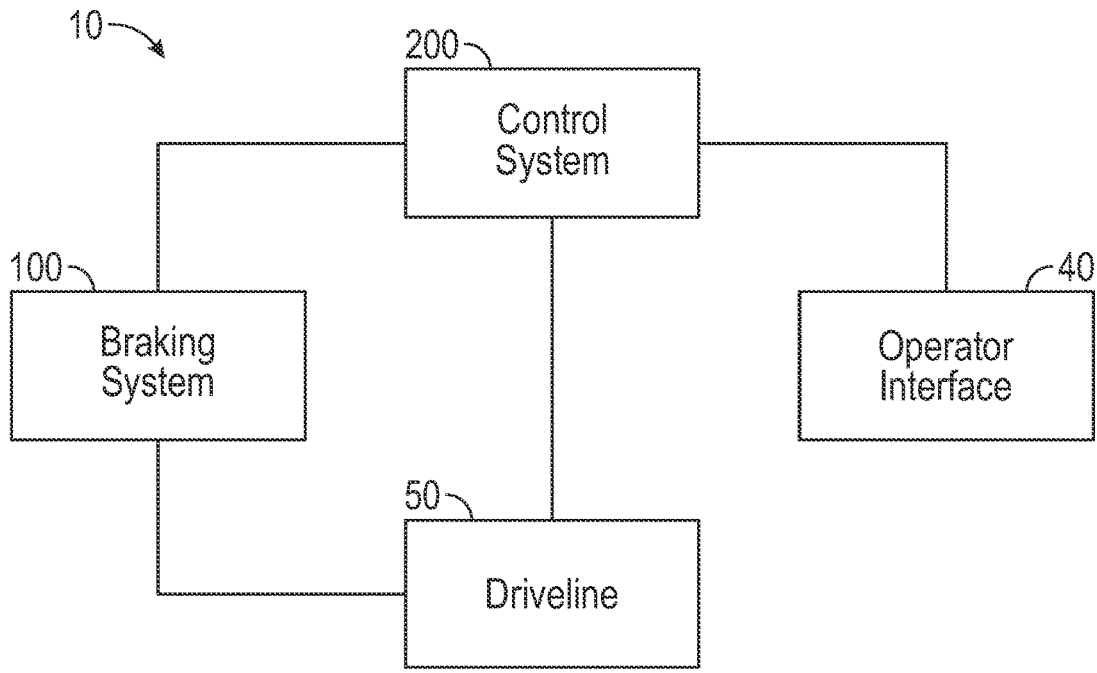
FIG. 2 is a schematic block diagram of the vehicle of FIG. 1, according to an exemplary embodiment.
Figure 3:
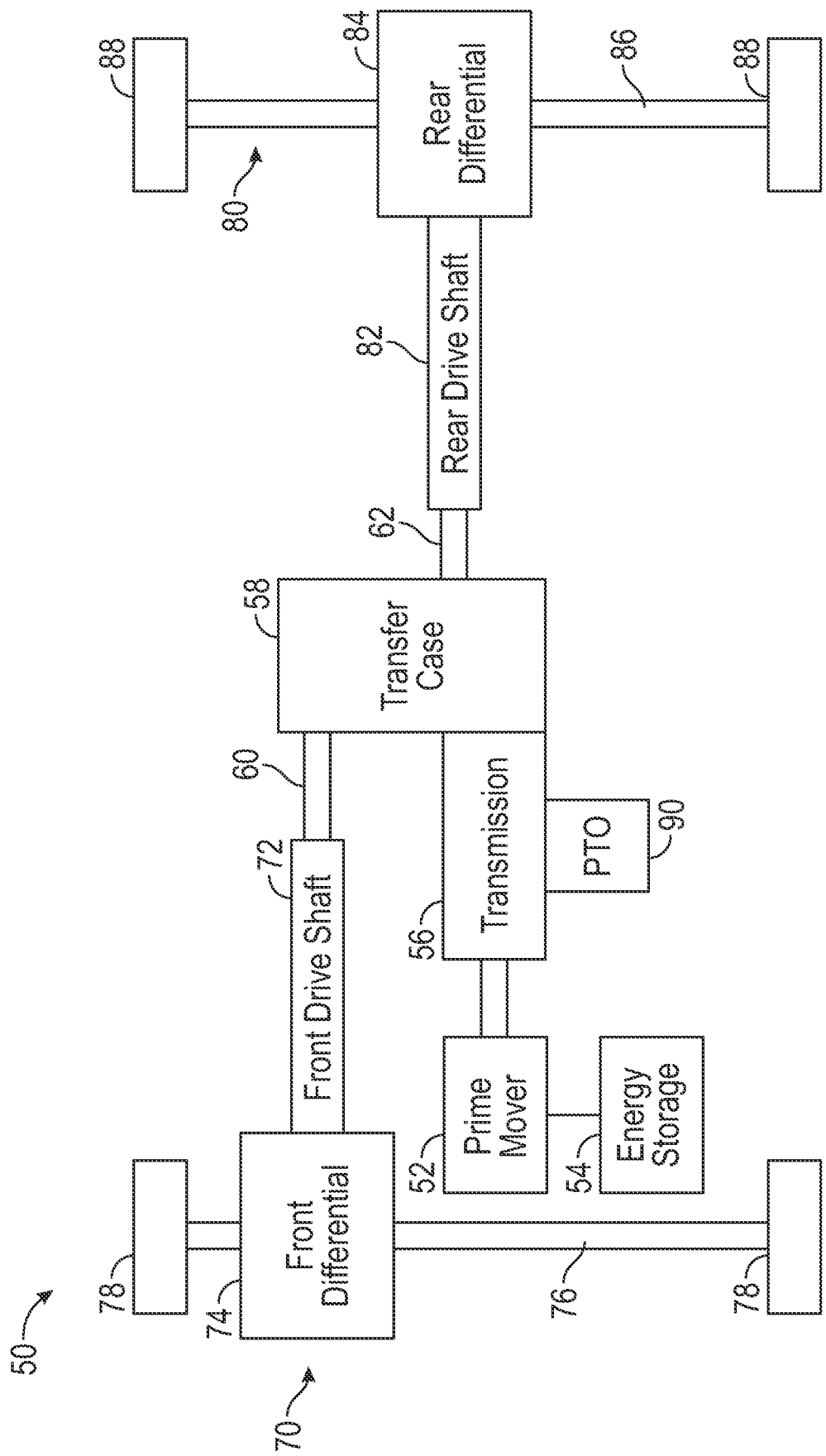
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 202, coupled to one or more components of the driveline 50 to facilitate selectively braking the one or more components of the driveline 50; an implement system, shown as implement system 204, coupled to one or more components of the drivetrain or body 20 to operate implements or machinery coupled to the vehicle 10; and a vehicle control system, shown as control system 200, coupled to the operator interface 40, the driveline 50, the implement system 204, and the braking system 202. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes an implement system 204 which may include one or more attached implements and/or trailed implements as such as a front mounted mower, a rear mounted mower, a trailed mower, a tedder, a rake, a baler, a plough, a cultivator, a rotavator, a tiller, a harvester, and/or another type of attached implement or trailed implement. The implements of implement system 204 may couple to the front or rear of vehicle 10 through various means, including, but not limited to, hydraulic hoses, electrical wires, PTO connection, three-point hitch, ball hitch, front forks, etc.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, an LCD display, an LED display, a speedometer, gauges, warning lights, etc. The one or more input device may be or include a steering wheel, a joystick, buttons, switches, knobs, levers, an accelerator pedal, an accelerator lever, a plurality of brake pedals, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, a mechanical front-wheel drive, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle). In some embodiments, the driveline includes a mechanical front-wheel drive assembly ("MFWD") in which the prime mover 52 is mechanically coupled to an axle disposed between the front tractive elements 78. A mechanical front-wheel drive assembly may be used when the vehicle has rear tractive element 88 of a different size than the front tractive elements 78.

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 202 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 202 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Steering Slop Compensation System

Steering System

Figure 4:
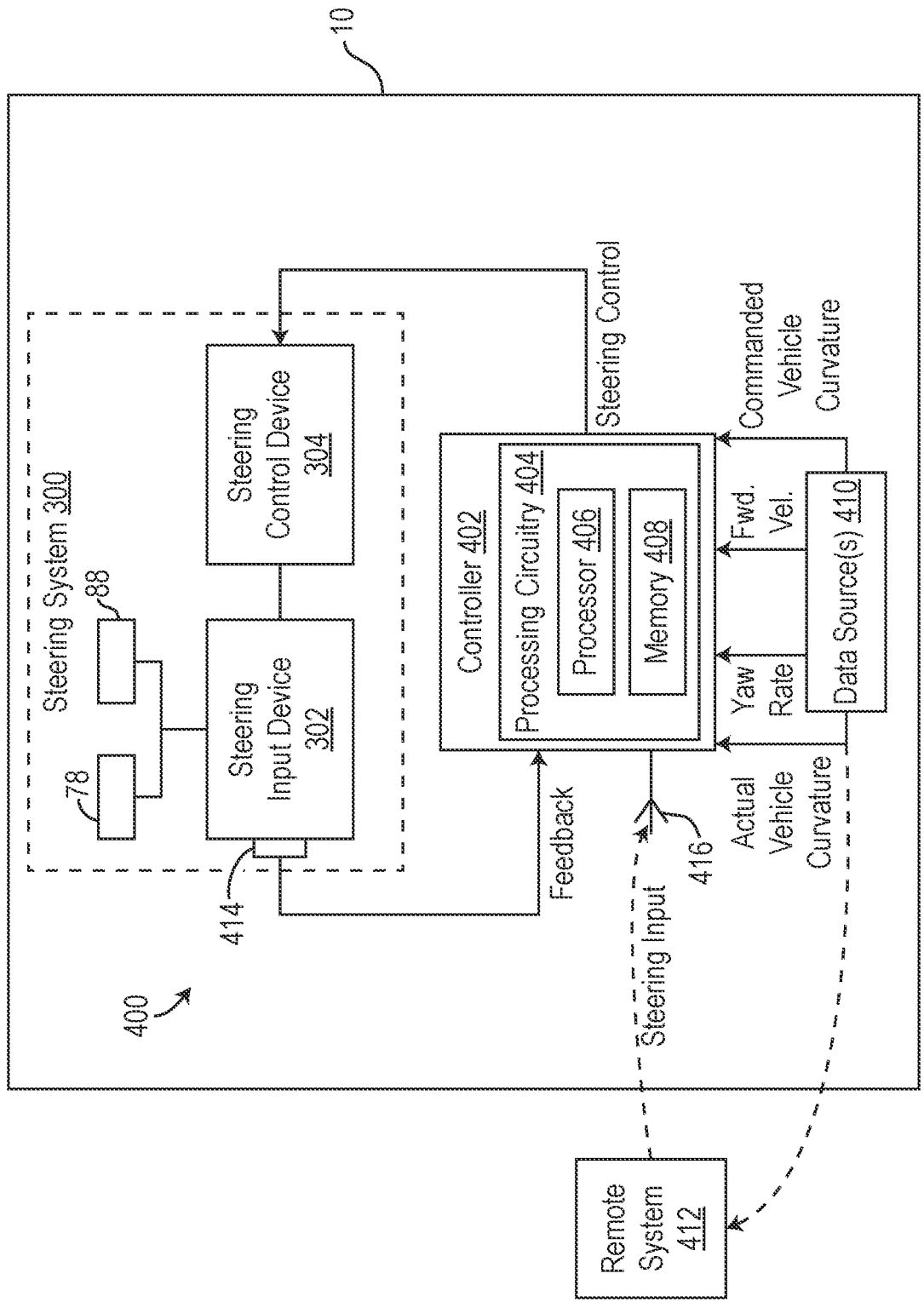
FIG. 4 is a block diagram of a control system for controlling steering of the vehicle of FIG. 1, according to an exemplary embodiment.

Referring to FIG. 4, the vehicle 10 may include a steering control system 400 for a steering system 300. The steering system 300 is operable to adjust an orientation of one or more pairs of tractive elements (e.g., tractive elements 78, tractive elements 88, etc.). In some embodiments, the steering system 300 is configured to adjust an orientation of the tractive elements 78 to indicate a turn of the vehicle 10. The steering system 300 may include a steering input device 302 (e.g., a steering wheel, a rotatable control device, a steering device, a steering input device, a joystick, etc.) and a steering control device 304. The steering control device 304 may include hydraulic actuators (e.g., a rack and pinion system), linear electric actuators, pneumatic actuators, hydraulic motors, etc., configured to use a steering control to adjust the orientation of the one or more pairs of tractive elements to perform the turn as indicated by the steering input device 302. In some embodiments, the steering control device 304 is an electric motor or electric transducer configured to receive the steering control and adjust an orientation of the steering input device 302. The steering control device 304 may be operably coupled with the steering input device 302 such that the steering control device 304 implements the steering control by adjusting an orientation, position, etc., of the steering input device 302. The steering input device 302 may be operable coupled with one or more steering components such as hydraulic components, rack and pinions, etc., in order to turn one or more of the tractive elements 78 or the tractive elements 88 to steer the vehicle 10.

The steering system 300 is operable by a controller 402 of the steering control system 400, according to some embodiments. In some embodiments, the controller 402 is configured to receive a steering input from the a remote system 412 and provide the steering control to the steering control device 304. In some embodiments, the controller 402 is configured to receive the steering input from a sensor (e.g., a rotary sensor, a potentiometer, etc.) of the steering input device 302. The controller 402 may receive feedback (e.g., encoder position, encoder feedback, encoder signals, etc.) from an encoder 414 that is configured to detect a position, rate of change, etc., of the steering input device 302. In some embodiments, the encoder 414 is a sensor that is provided as a component of the steering control device 304. The steering input indicates a degree and/or a rate of turn of the steering input device, or may indicate a commanded curvature of the vehicle 10. The controller 402 is configured to use the steering input to determine and output the steering control to the steering control device 304. In some embodiments, the controller 402 is configured to modify the steering control or generate the steering control in order to account for slop or play in the steering input device 302. For example, when an operator or the steering control device 304 turns the steering input device 302, a delay between the time at which the steering input device 302 is turned and the tractive elements 78 are turned may be present, due to slop in a steering column of the steering system 300. Further, the steering input device 302 or the steering control device 304 may themselves have some degree of slop such that initial turning of the steering input device 302 or operation of the steering control device 304 does not result in immediate rotation or turning of the tractive elements 78 that are operably coupled with the steering input device 302. In some embodiments, one or more components of the steering system 300 are retrofit or a "pin-on" components for existing steering system architecture. For example, the encoder 414 and the steering control device 304 may be retrofit components on the steering input device 302 in order to enable autonomous or remote steering of the vehicle 10 (in addition to other components to control driveline operations remotely). Further, different agricultural vehicles may have different steering systems 300 which can have different amounts of slop in their steering input devices 302 or steering columns. Advantageously, the controller 402 is configured to account for slop in the steering system 300 and generate or adjust the steering control to account for the slop to enhance control of the steering system 300.

The controller 402 may also be configured to obtain various sensor data from one or more data source(s) 410 including actual vehicle curvature of the vehicle 10, yaw rate of the vehicle 10, forward velocity of the vehicle 10, and commanded vehicle curvature of the vehicle 10. In some embodiments, the steering input includes the commanded vehicle curvature. In some embodiments, the data source(s) 410 include various sensors, systems, subsystems, Global Positioning System (GPS), etc., of the vehicle 10. In particular, the GPS of the data sources 410 of the vehicle 10 may obtain the actual vehicle curvature and provide the actual vehicle curvature to the controller 402 and the remote system 412.

Referring still to FIG. 4, the controller 402 includes a circuit, shown as processing circuitry 404, a processor, shown as processor 406, and memory, shown as memory 408, according to an exemplary embodiment. Controller 402 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 4, controller 402 includes the processing circuitry 404 and memory 408. Processing circuitry 404 may include an ASIC, one or more FPGAs, a DSP, circuits containing one or more processing components, circuitry for supporting a microprocessor, a group of processing components, or other suitable electronic processing components. In some embodiments, processing circuitry 404 is configured to execute computer code stored in memory 408 to facilitate the activities described herein. Memory 408 may be any volatile or non-volatile computer-readable storage medium capable of storing data or computer code relating to the activities described herein. According to an exemplary embodiment, memory 408 includes computer code modules (e.g., executable code, object code, source code, script code, machine code, etc.) configured for execution by processing circuitry 404. In some embodiments, controller 402 may represent a collection of processing devices (e.g., servers, data centers, etc.). In such cases, processing circuitry 404 represents the collective processors of the devices, and memory 408 represents the collective storage devices of the devices.

It should be understood that any of the functionality, model generation techniques, regressions, time delay estimation techniques, controls, etc., of the controller 402 as described herein with reference to FIGS. 4-11 may be performed by the remote system 412. The remote system 412 may be similar to the controller 402 including processing circuitry, processors, memory, etc. In some embodiments, the remote system 412 and the controller 402 are communicably coupled with each other via a telematics unit (e.g. a transceiver, a wireless transmitter, a radio, a cellular dongle, etc.) of the vehicle 10. In some embodiments, the steering input device 302 is operably coupled via components of the steering system 300 similar to or the same as described in U.S. application Ser. No. 17/404,878, filed Aug. 17, 2021, the entire disclosure of which is incorporated by reference herein. The steering input device 302 may also be operably coupled with the tractive elements 78 or the tractive elements 88 in order to rotate the tractive elements 78 or the tractive elements 88 using any other steering system components (e.g., control arms, rack and pinions, gear sets, etc.).

Smith Predictor

Figure 5:
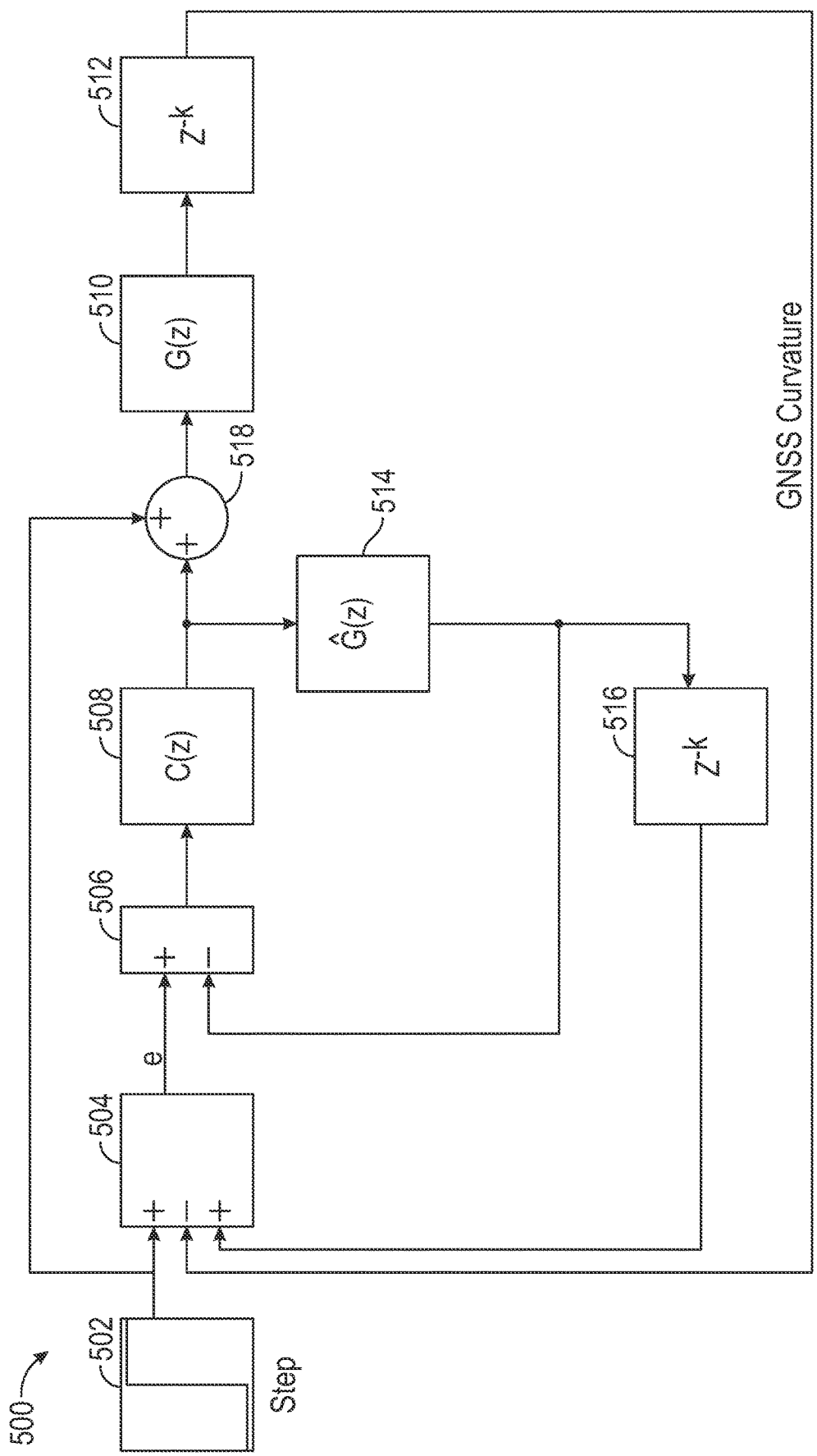
FIG. 5 is a block diagram of a Smith Predictor that is implemented on a controller of the control system of FIG. 4, according to an exemplary embodiment.

Referring to FIG. 5, the controller 402 may implement a Smith Predictor, illustrated by control diagram 500, according to some embodiments. In some embodiments, the control diagram 500 illustrates functionality performed by the controller 402 (e.g., the processing circuitry 404). The functionality of the control diagram 500 described herein may be stored in the memory 408 of the controller 402 and implemented by the processor 406 and the processing circuitry 404.

The control diagram 500 includes a step input 502 that is provided to an error estimator 504 and a summation block 518. The step input 502 may represent the steering input. The control diagram 500 also includes a summation block 506, a controller block 508, an internal plant model 514, a plant 510, a plant time delay 512, and an internal plant time delay 516. The error estimator 504 is configured to estimate an error e and output the error e to the summation block 506. The summation block 506 is configured to receive the error e and an output of the internal plant model 514 and determine a difference (by subtracting the output of the internal plant model 514 from the error e). The difference between the error e and the output of the internal plant model 514 (e.g., the output of $\hat{G}(z)$) is provided to the controller block 508 (e.g., C(z)). The controller block 508 outputs an adjustment amount which is provided to the summation block 518. The summation block 518 uses the adjustment and adds the adjustment amount to the step input 502. The summation block 518 may, generally, add the step input 502 with the adjustment amount provided by the controller 508 to determine a control output for the plant 510. The plant 510 represents the steering system 300. The control output provided by the summation block 518 is provided to the plant 510 (e.g., the steering control device 304) as the steering control. The plant 510 uses the control output and provides feedback to the time delay 512. In some embodiments, the plant 510 and the time delay 512 represent the steering system 300 such that the steering system 300 inherently has a time delay and steering system-specific plant characteristics.

The feedback from the plant 510 and the time delay 512 is provided to the error estimator 504 for use in determining the error e. In some embodiments, the output of the internal plant model 514 is provided to the time delay 516, and a delayed output of the internal plant model 514 is provided to the error estimator 504. In some embodiments, the output of the internal plant model 514 is provided to the summation block 506. The internal plant model 514 may be an estimated model of the plant 510 such that the internal plant model 514 predicts, with some degree of accuracy, the output of the plant 510. The output of the plant is used b the controller 508 in order to determine the adjustment for the step input 502. The error estimator 504 is configured to add the step input 502 with the delayed output of the plant 510 (e.g., the output of the time delay 512, shown as global navigation satellite system "GNSS" curvature), and subtract the delayed output of the internal plant model 514 from the summation of the step input 502 and the delayed output of the plant 510. The GNSS curvature may be the actual vehicle curvature shown and described in greater detail above with reference to FIG. 4. It should be understood that the "actual vehicle curvature" "true vehicle curvature" "true response," etc., described herein may refer to the GNSS curvature that is obtained by the GPS system of the vehicle 10 and indicate a path of curvature actually traversed by the vehicle 10.

Advantageously, the internal plant model 514 is configured to predict the process being controlled (e.g., the plant 510) as a function of the control input provided by the controller 508 (e.g., C(z)). In some embodiments, the block diagram 500 illustrates a Smith Predictor that predicts future behavior of the plant 510 and uses the predicted future behavior of the plant 510 to compensate for any time delays using a feedback loop. By doing so, the Smith Predictor illustrated by the block diagram 500 can aid in reducing effects of time delay on the stability and performance of the steering system 300. In some embodiments, the Smith Predictor illustrated b the block diagram 500 uses a machine learning (ML) based curvature-to-encoder converter to generate encoder commands with a curvature controller (e.g., the controller 508) being configured to compensate for potential time delays.

Figure 6:
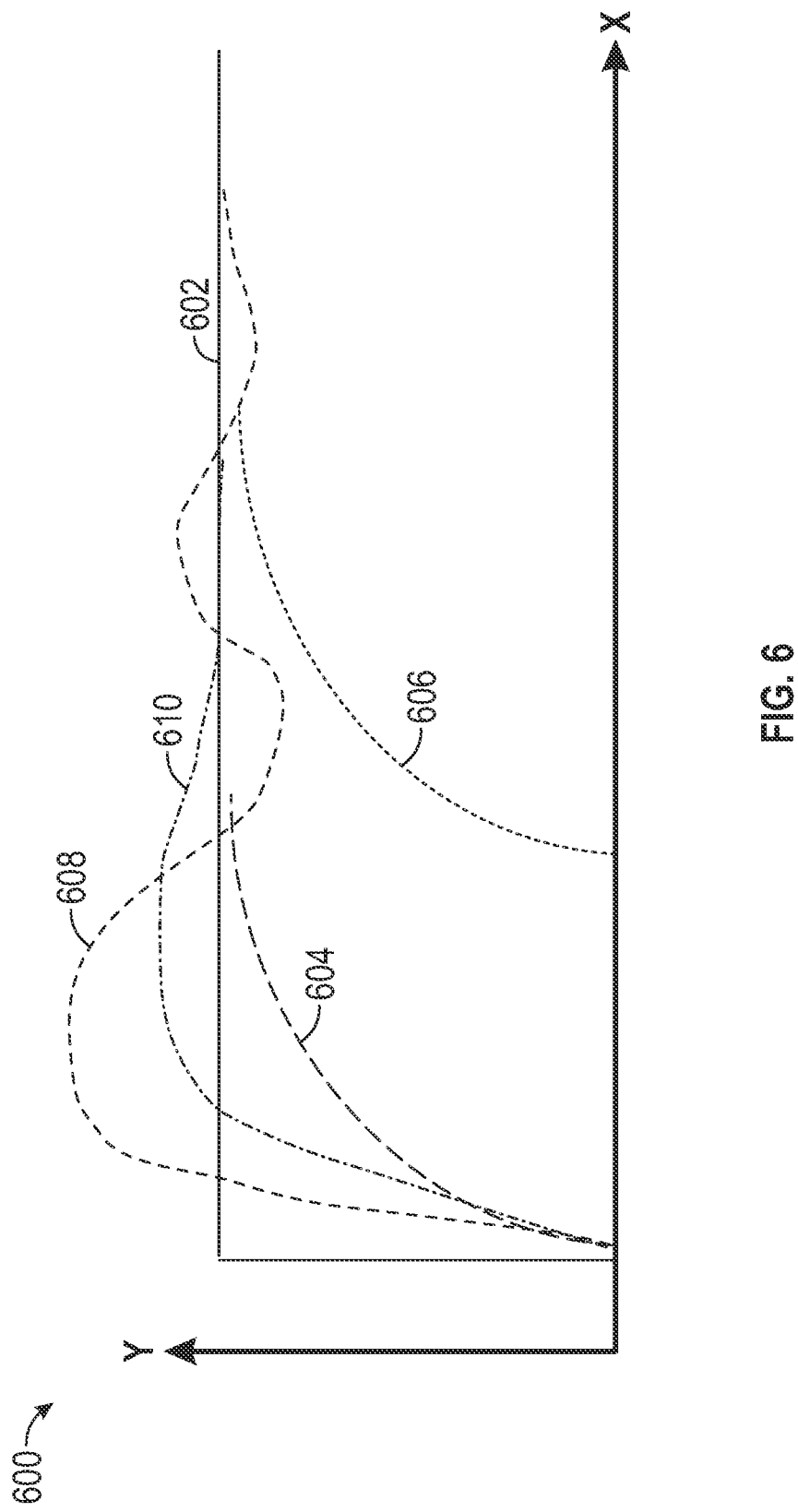
FIG. 6 is a diagram illustrating different curvatures or paths of the vehicle of FIG. 1 and an impact of a time delay or slop in a steering system of the vehicle, according to an exemplary embodiment.

Referring to FIG. 6, a graph 600 illustrates control of the steering system 300 along a curvature, according to some embodiments. The graph 600 may illustrate various paths or curvatures taken by the vehicle 10 in a field when making a right hand turn. The graph 600 includes a step curve 602 for reference (e.g., a commanded control curve) and corresponding output curves. The graph 600 also includes an ideal response curve 604, a delayed response curve 606, an over driven system curve 608, and a Smith Predictor compensated curve 610. As shown in FIG. 6, the Smith Predictor compensated curve 610 provides an improved response for the steering system 300 compared to the delayed response curve 606 which would occur without the Smith Predictor as illustrated in FIG. 5. The over driven system curve 608 illustrates a curvature of the vehicle 10 when excessive slop is present in the steering system 300.

Figure 7:
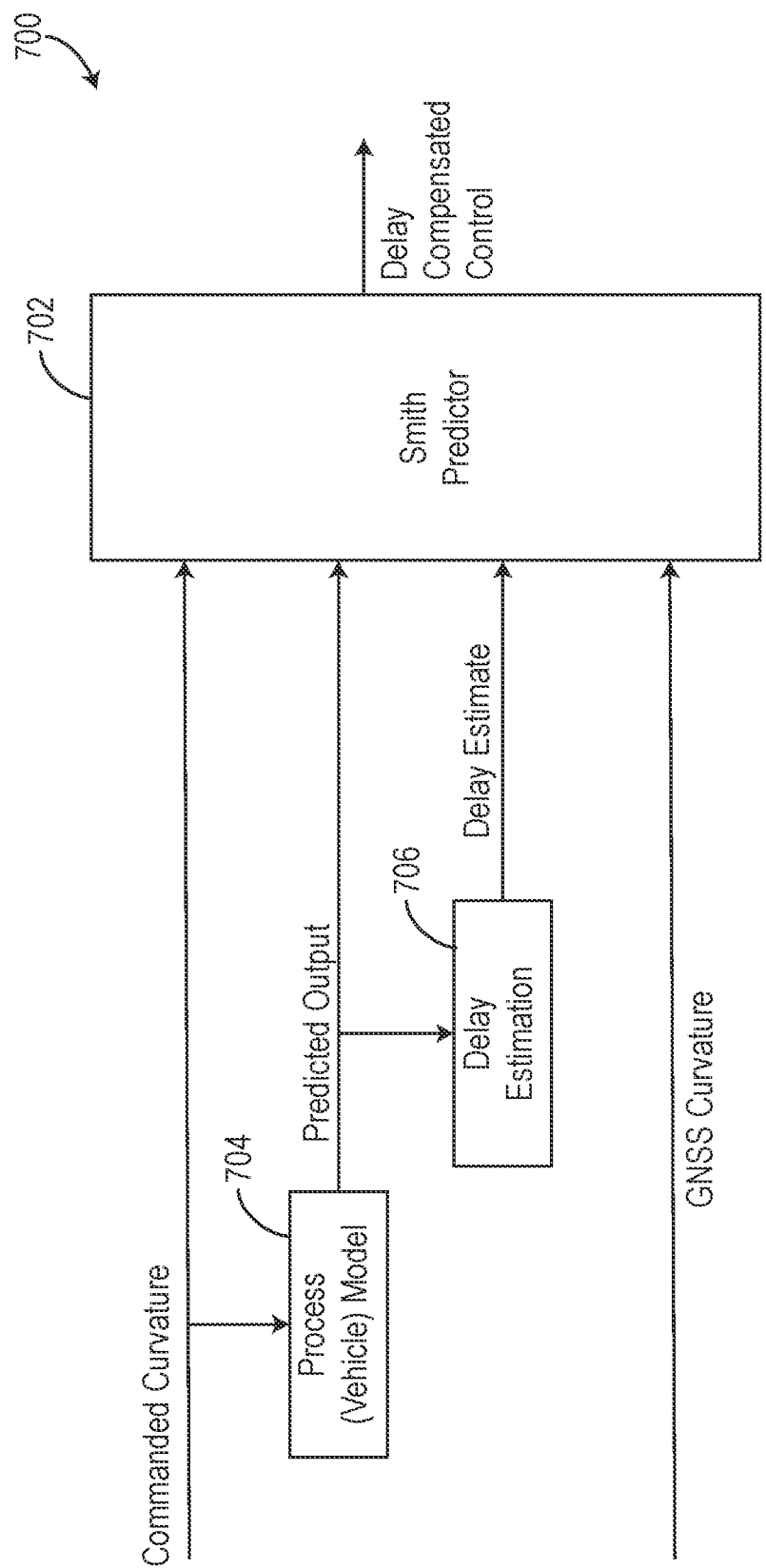
FIG. 7 is a block diagram of the Smith Predictor of FIG. 5 illustrating a model and a time delay estimation portion, according to some embodiments.

Referring to FIG. 7, a block diagram 700 illustrates components of the Smith Predictor, according to some embodiments. The block diagram 700 illustrates functions or portions of the Smith Predictor implemented on the controller 402, according to some embodiments. In some embodiments, the block diagram 700 illustrates that a control generator 702 (e.g., the Smith Predictor implemented on the controller 402) includes a process model 704 and a delay estimation 706. In some embodiments the process model 704 is the same as or similar to the internal plant model 514. In some embodiments, the process model 704 is configured to receive a commanded curvature input (e.g., the step input 502) and provide or output a predicted output of the steering system 300 or the vehicle 10. The predicted output is provided to the output generator 702 as well as the commanded curvature. The predicted output is also provided to the delay estimator 706.

The delay estimation 706 is configured to use the predicted output to estimate a delay, shown as delay estimate. The delay estimate is provided to the output generator 702 as an input, according to some embodiments. In some embodiments, the output generator 702 is configured to receive the commanded curvature, the predicted output, the delay estimation, and feedback curvature and output a delay compensated control for the steering system 300. The Smith Predictor illustrated in FIG. 7 generally includes both the vehicle model 704 and the delay estimation 706 which may be determined using different techniques as described herein.

Vehicle Model

Referring to FIGS. 4 and 5, the controller 402 is configured to determine and use a vehicle model, according to some embodiments. In some embodiments, the controller 402 is configured to use a sparse identification of nonlinear dynamics ("SINDy") technique in order to determine the vehicle model (e.g., the internal plant model 514). The controller 402 may obtain input data (e.g., vehicle measurement data) regarding multiple states including estimated turning curvature, estimated vehicle yaw rate, commanded vehicle curvature, and forward velocity. In some embodiments, the vehicle model is tailored for the specific vehicle 10 on which the vehicle model is generated.

Figure 8:
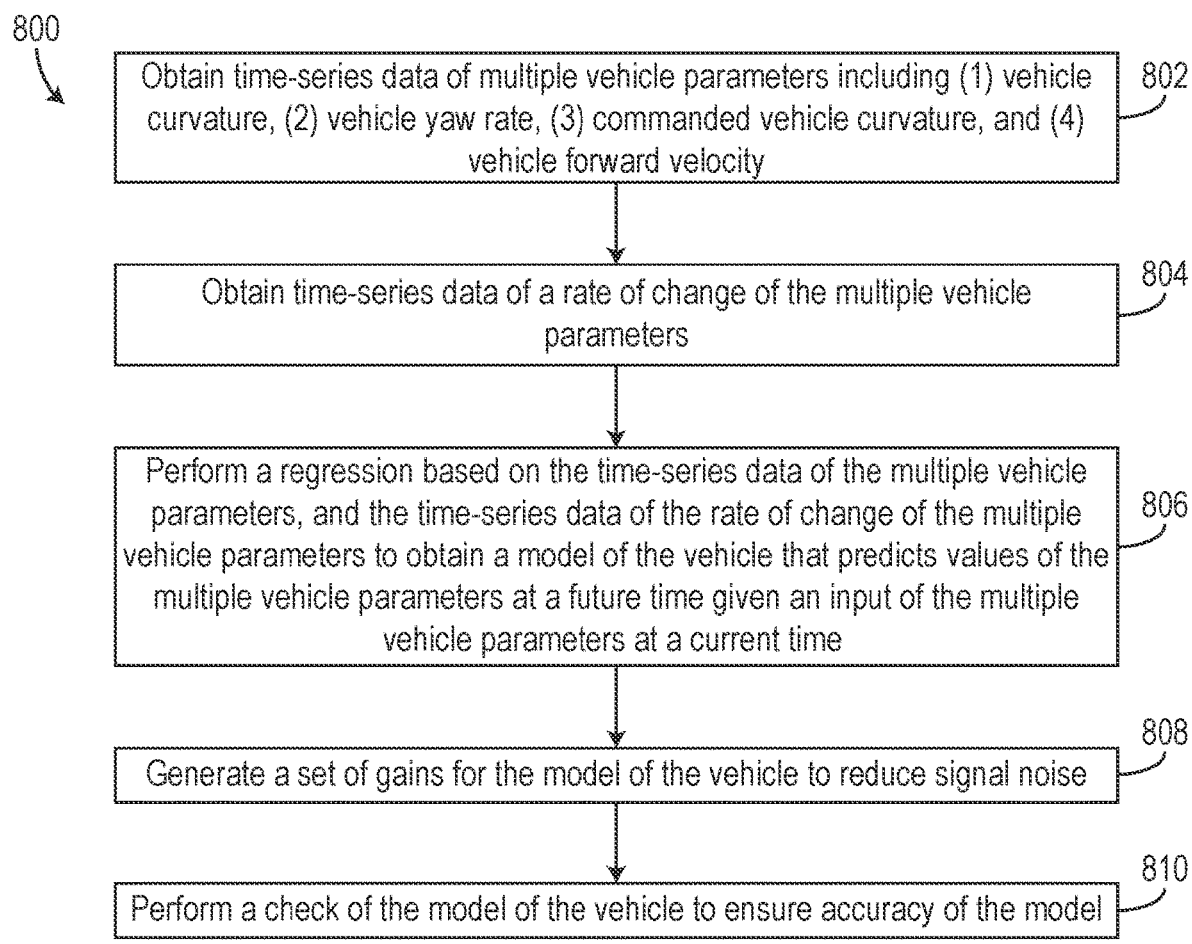
FIG. 8 is a flow diagram of a process for obtaining a model of a steering system of the vehicle of FIG. 1, according to an exemplary embodiment.

Referring to FIG. 8, a flow diagram of a process 800 for generating the vehicle model includes steps 802-810, according to some embodiments. In some embodiments, the process 800 is performed by the controller 402 based on data obtained from one or more data sources 410 (shown in FIG. 4) of the vehicle 10. In some embodiments, the data sources 410 as shown in FIG. 4 include sensors, systems, subsystems, etc., of the vehicle 10. The process 800 can be performed in order to determine the internal plant model 514 of the Smith Predictor illustrated in FIG. 5.

The process 800 includes obtaining time-series data of multiple vehicle parameters including (1) vehicle curvature, (2) vehicle yaw rate, (3) commanded vehicle curvature, and (4) vehicle forward velocity (step 802), according to some embodiments. In some embodiments, step 802 is performed by the controller 402 by obtaining the multiple vehicle parameters over a time period (e.g., a learning time period). In some embodiments, the vehicle curvature is a GNSS curvature of the vehicle 10 obtained from a GPS of the vehicle 10. In some embodiments, the vehicle yaw rate is obtained from a steering sensor or the GPS of the vehicle 10 (e.g., the GPS of the vehicle 10 as described in greater detail above with reference to the data source(s) 410 of FIG. 4). In some embodiments, the commanded vehicle curvature is obtained from a steering sensor or steering encoder of the vehicle 10 (e.g., the steering system 300). In some embodiments, the vehicle forward velocity is obtained from the GPS of the vehicle 10, a wheel speed sensor, etc.

For example, the time series data of the multiple vehicle parameters may be used to model nonlinear dynamics of states of the vehicle 10. In some embodiments, the multiple vehicle parameters are organized by the controller 402 in a first state matrix:

$$X = \begin{bmatrix} x^T(t_1) \\ x^T(t_2) \\ \vdots \\ x^T(t_m) \end{bmatrix} = \begin{bmatrix} x_1(t_1) & x_2(t_1) & \cdots & x_n(t_1) \\ x_1(t_2) & x_2(t_2) & \cdots & x_n(t_2) \\ \vdots & \vdots & \ddots & \vdots \\ x_1(t_m) & x_2(t_m) & \cdots & x_n(t_m) \end{bmatrix}$$

where the multiple vehicle parameters are represented by $x_1 \ldots x_n$, the different states from 1 to an nth state (e.g., different parameters or measured data). In particular, each column of the first state matrix represents a time-series of data obtained from a particular sensor, measurements of a particular parameter, etc. Similarly, the different rows represent different times at which each of the states (e.g., the multiple vehicle parameters) are measured.

The process 800 includes obtaining time-series data of a rate of change of the multiple vehicle parameters (step 804), according to some embodiments. In some embodiments, step 804 is performed by the controller 402 and includes calculating or estimating the rate of change of each of the multiple vehicle parameters. In some embodiments, step 804 includes organizing the time-series data of the rate of change of the multiple vehicle parameters in a second state matrix:

In some embodiments, the controller 402 is configured to model nonlinear dynamics of the states of the vehicle 10 by performing a regression which has the form Ax=b. In some embodiments, the model generation process includes using a first state matrix:

$$\dot{X} = \begin{bmatrix} \dot{x}^T(t_1) \\ \dot{x}^T(t_2) \\ \vdots \\ \dot{x}^T(t_m) \end{bmatrix} = \begin{bmatrix} \dot{x}_1(t_1) & \dot{x}_2(t_1) & \cdots & \dot{x}_n(t_1) \\ \dot{x}_1(t_2) & \dot{x}_2(t_2) & \cdots & \dot{x}_n(t_2) \\ \vdots & \vdots & \ddots & \vdots \\ \dot{x}_1(t_m) & \dot{x}_2(t_m) & \cdots & \dot{x}_n(t_m) \end{bmatrix}$$

The second state matrix shown above, represents a rate of change or how particular states influence each other over time. In particular, the second state matrix has the substantially same form as the first state matrix but includes rate of change of each of the states (e.g., the multiple vehicle parameters) at each of the time steps $t_1 \ldots t_m$.

The process 800 includes performing a regression based on the time-series data of the multiple vehicle parameters and the time-series data of the rate of the change of the multiple vehicle parameters to obtain a model of the vehicle that predicts values of the multiple vehicle parameters at a future time given an input of the multiple vehicle parameters at a current time (step 806), according to some embodiments. In some embodiments, step 806 includes performing a SINDy regression technique. Step 806 may include constructing a regression problem having the form Ax=b. In particular, step 806 may include constructing a regression problem having the form:

$$\dot{X} = \Theta(X) \Xi$$

where $\dot{X}$ is the second state matrix, X is the first state matrix, $\Theta$ is a candidate function vector including candidate terms that can be used for the regression, and $\Xi$ includes multiple sparse vectors of coefficients which determine which terms are active. In particular, the candidate function vector may be a library including candidate nonlinear functions of the columns of the first state matrix X:

$$\Theta(X) = [\,1 \quad X \quad X^{P_2} \quad X^{P_3} \quad \cdots \quad \sin(X) \quad \cos(X) \quad \cdots\,]$$

In the example of $\Theta(X)$ shown above, the library includes a linear function or term X, higher order polynomial functions or terms $X^{P_n}$ (e.g., an nth polynomial), and trigonometric functions sin (X) and cos (X). In some embodiments, the library includes additional or other functions than shown above. In some embodiments, the term $\Xi$ defines multiple sparse vectors of coefficients in order to determine which terms are active in the library. In some embodiments, $\Xi=[\xi_1\ \xi_2\ \ldots\ \xi_3]$ where each column $\xi_k$ is a sparse vector of coefficients determining which terms or functions of the library are active. Step 804 can include performing a sparse regression across multiple dimensions in order to determine the values of each of the sparse vectors and identify which terms or functions of the library are active in the modeled portion of the vehicle.

In some embodiments, the model of the vehicle has the form:

$$X(k+1) = \phi * X(k) + \Gamma * U(k)$$

where X(k+1) is a prediction of the vehicle curvature and the vehicle yaw rate at a future time, $\phi$ is a matrix indicating coefficients, correlation parameters, or functions obtained by performing the regression process to correlate one or more of the states (e.g., the vehicle curvature or GNSS curvature and the vehicle yaw rate) with predicted future states, $\Gamma$ is a matrix indicating coefficients, correlation parameters, or functions obtained by performing the regression process to correlate one or more inputs (e.g., the commanded vehicle curvature and the vehicle forward velocity) with predicted future states (e.g., the vehicle curvature or GNSS curvature and the vehicle yaw rate) given current values of the states, X(k) includes the values of one or more of the states (e.g., the vehicle curvature or the GNSS curvature and the vehicle yaw rate) at a current time, X(k+1) includes the values of the one or more states (e.g., the vehicle curvature or the GNSS curvature and the vehicle yaw rate) at a future time, and U(k) includes the inputs at the current time (e.g., the commanded vehicle curvature and the vehicle forward velocity). In some embodiments, the time-series measurements of the vehicle curvature and the vehicle yaw rate, as well as the time-series measurements of the rate of change of the vehicle curvature and the vehicle yaw rate are used to determine the matrix $\phi$. Similarly, the time-series measurements of the commanded vehicle curvature and the vehicle forward velocity, and the time-series measurements of the rate of change of the commanded vehicle curvature and the vehicle forward velocity are used to determine the matrix $\Gamma$. In some embodiments, the $\phi$ and the $\Gamma$ matrices are both 2×2 matrices. It should be understood that while the step 806 as described herein is described as implementing a SINDy regression technique, any other regression technique can be used in order to determine an observer or state model of the vehicle 10 (e.g., X(k+1)=$\phi$*X(k)+$\Gamma$*U(k)).

The process 800 includes generating a set of gain parameters for the model of the vehicle to reduce signal noise (step 808), according to some embodiments. In some embodiments, step 808 is performed by the controller 402. In some embodiments, step 808 includes using a Riccati equation or technique to generate optimal observer gains for the model of the vehicle 10. In some embodiments, the gains are generated in order to stabilize the vehicle observer or state estimator (e.g., the model of the vehicle 10) and to reduce signal noise. In some embodiments, step 808 includes selecting bias factors in the form of a gain matrix in order to bias the vehicle 10 towards the model of the vehicle 10 as opposed to direct measurements. In some embodiments, the gain parameters are determined using the @ matrix, a first identity matrix, a diagonal matrix, and a second identify matrix. In some embodiments, the gain parameters are stored in a K matrix which may be transposed into an L matrix. The K matrix and the L matrix may be 2×2 matrices.

The process 800 includes performing a check of the model of the vehicle to ensure accuracy of the model (step 810), according to some embodiments. In some embodiments, step 810 includes performing an eigenvalue check and a quality or closeness test of the model generated in steps 806-808. In some embodiments, step 810 is performed by the controller 402. In some embodiments, performing the eigenvalue check includes calculating eigenvalues of the closed loop observer system (e.g., the model of the vehicle $\phi$, $\Gamma$, and the L matrices. If the real parts of the eigenvalues estimated in step 810 are less than 1, then the controller 402 may determine that the model of the vehicle 10 (e.g., the observer) is stable. In some embodiments, the quality or closeness test of the model includes checking the quality of data used to generate, determine, or produce the model. In some embodiments, once the $\phi$, $\Gamma$, and L matrices are generated, the same values of the multiple vehicle parameters in steps 802-804 are passed through the model produced in steps 806-808. The results of the model (e.g., the predicted vehicle curvature at the next step) may be compared to actual data (e.g., the actual vehicle curvature). In some embodiments, a deviation between the results of the model and the actual data is determined as model error. The quality or closeness test may include calculating the following parameter:

$$100 * \frac{\int \mathrm{abs(model\ error)} dt}{\int \mathrm{abs}(GNSS\ \mathrm{curvature}) dt}$$

and comparing the parameter to a threshold. If the parameter is below the threshold (e.g., a pre-determined value), then the controller 402 may determine that the model generated in steps 806-808 is accurate and acceptable for use in the Smith Predictor as shown in FIG. 5.

Delay Estimation

Figure 9:
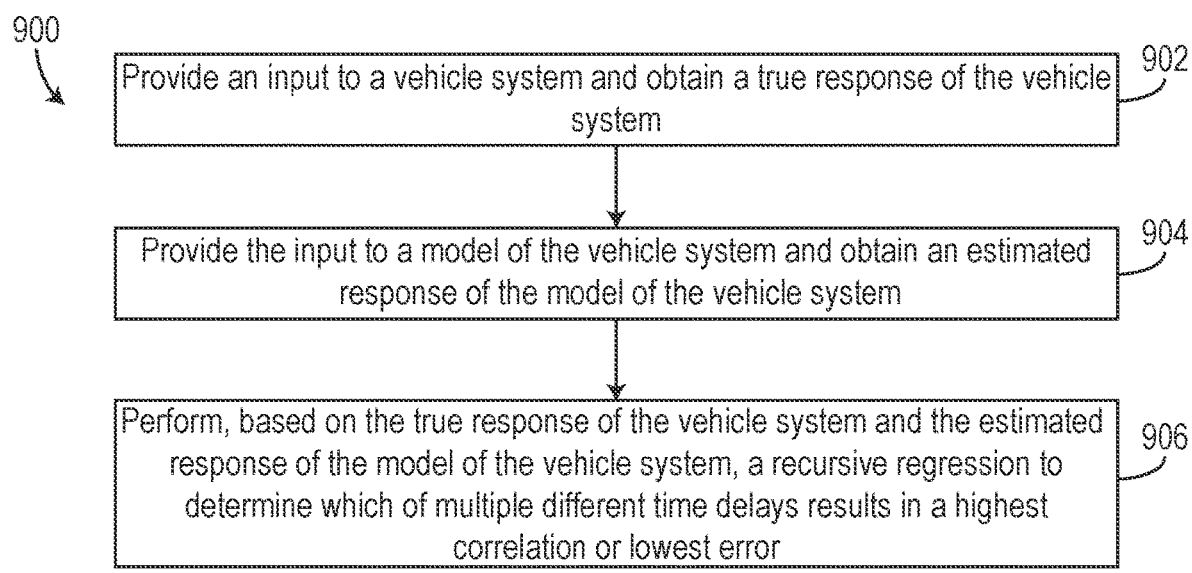
FIG. 9 is a flow diagram of a process for obtaining a time delay estimation of the steering system of the vehicle of FIG. 1, according to an exemplary embodiment.

Referring to FIGS. 4 and 9, the controller 402 may be configured to perform a delay estimation process in order to estimate, determine, or calculate a delay of the steering system 300 for use in the Smith Predictor as internal plant time delay 516. In some embodiments, the delay of the steering system 300 may be estimated by providing a control input to the steering system 300 and observing an amount of time required to detect a response of the steering system 300. In some embodiments, the delay of the steering system 300 is obtained by performing a recursive regression technique in order to identify a time delay that achieves a best correlation (e.g., lowest error) between an actual output or response of the plant 510 and the control input or a predicted output of a model of the plant 510 (e.g., the vehicle model obtained by performing the techniques described in greater detail above with reference to FIG. 8).

Referring particularly to FIG. 9, a flow diagram of a process 900 for estimating a time delay of the steering system 300 includes steps 902-906, according to some embodiments. In some embodiments, the process 900 is implemented using the model of the vehicle (e.g., the model of the steering system 300) obtained by performing process 800 as described in greater detail above with reference to FIG. 8.

The process 900 includes providing an input to a vehicle system and obtaining a true response of the vehicle system (step 902), according to some embodiments. In some embodiments, step 902 includes providing a sine wave as an input to the steering system 300. The input provided to the steering system 300 may be a commanded curvature of the vehicle (e.g., a commanded GNSS curvature of the vehicle 10). In some embodiments, step 902 is performed by the controller 402 by providing the input to the steering system 300 of the vehicle 10 and observing a response of the vehicle 10 (e.g., observing a response of the vehicle 10 such as an actual curvature of the vehicle 10). In some embodiments, the sine wave is modulated across different frequencies while provided as the input in order to obtain true responses of the vehicle system (e.g., the steering system 300, represented by the plant 510 and the plant time delay 512) across different frequencies of the sinusoidal input. In some embodiments, the true response of the system is obtained as time series data.

The process 900 includes providing the input to a model of the vehicle system and obtaining an estimated response of the model of the vehicle system (step 904), according to some embodiments. In some embodiments, the input provided to the model of the vehicle system is the same input as the input provided to the vehicle system in step 902 to obtain the true response of the system. In some embodiments, obtaining the estimated response of the model of the vehicle system (step 904) includes obtaining time series data of the estimated response of the model. The time series data may be collected as an output of the model of the vehicle system. In some embodiments, the model of the vehicle system is a model that predicts an output or response of the vehicle system (e.g., the steering system 300) assuming no time delays are present (e.g., assuming instantaneous response).

The process 900 includes performing, based on the true response of the vehicle system and the estimated response of the model of the vehicle system, a recursive regression to determine which of multiple different time delays results in a highest correlation or lowest error (e.g., between the true response of the vehicle system and the estimated response of the model of the vehicle system) (step 906), according to some embodiments. In some embodiments, step 906 includes performing a least squares regression or a lasso regression. In some embodiments, step 906 is performed by the controller 402. In some embodiments, the true response of the vehicle system is the GNSS curvature of the vehicle 10, and the estimated response of the vehicle system is an estimation or prediction of the GNSS curvature of the vehicle 10 as provided by the model, assuming no time delays (e.g., assuming instantaneous response).

Step 906 may include constructing a Hankel matrix based on the estimated response provided by the model of the vehicle system. In some embodiments, each column of the Hankel matrix includes portions of the time series data of the estimated response, shifted different time delay amounts. The Hankel matrix may have the form:

$$H = \begin{bmatrix} T_1 & T_2 & \ldots & T_k & \ldots & T_n \\ T_2 & T_3 & \ldots & T_{k+1} & \ldots & T_{n+1} \\ \ldots & \ldots & \ldots & \ldots & \ldots & \ldots \\ T_k & T_{k+1} & \ldots & M_1 & \ldots & \ldots \\ \ldots & \ldots & \ldots & \ldots & \ldots & \ldots \\ T_n & T_{n+1} & \ldots & T_{n+k-1} & \ldots & T_{2n-1} \end{bmatrix}$$

where at least a portion of each column is the time series data of the estimated response, shifted a different time delay amount. For example, the second column is shown shifted backwards in time a time delay amount corresponding to an amount of elapsed time between $T_1$ and $T_2$.

Step 906 may include performing a least squares regression between the true response and the estimated response or a lasso regression between the true response and the estimated response. In some embodiments, the least squares regression or the lasso regression are performed as part of an optimization (e.g., a minimum or maximum seeking process). The optimization performed in step 906 may have the form:

$$\underset{x}{\operatorname{argmin}}\ L(x)$$
$$L = \|Ax - b\|_2 \quad \text{(Least Squares)}$$
$$L = \|Ax - b\|_2 + \lambda\|x\|_1 \quad (LASSO)$$

where Ax represents the estimated response of the system while accounting for a time delay (e.g., x) and b represents the true response of the system. In some embodiments, Ax is at least a portion of a column of the Hankel matrix that corresponds to the output or response of the model assuming a corresponding time delay. The optimization performed in step 906 can include selecting or identifying x (e.g., the time delay) that results in a minimization of error between the true response and the estimated response and therefore has a highest correlation. In some embodiments, the lasso regression includes the term $\lambda\|x\|_1$ which represents a number of terms of x (e.g., a number of elements of a column of the Hankel matrix) used in the regression. The lasso regression may be performed in order to obtain a time delay that requires a least amount of terms of the Hankel matrix. In some embodiments, the lasso regression facilitates sparsity in the regression. Once the time delay is obtained, the time delay can be used in the Smith Predictor as internal plant time delay 516.

Figure 10:
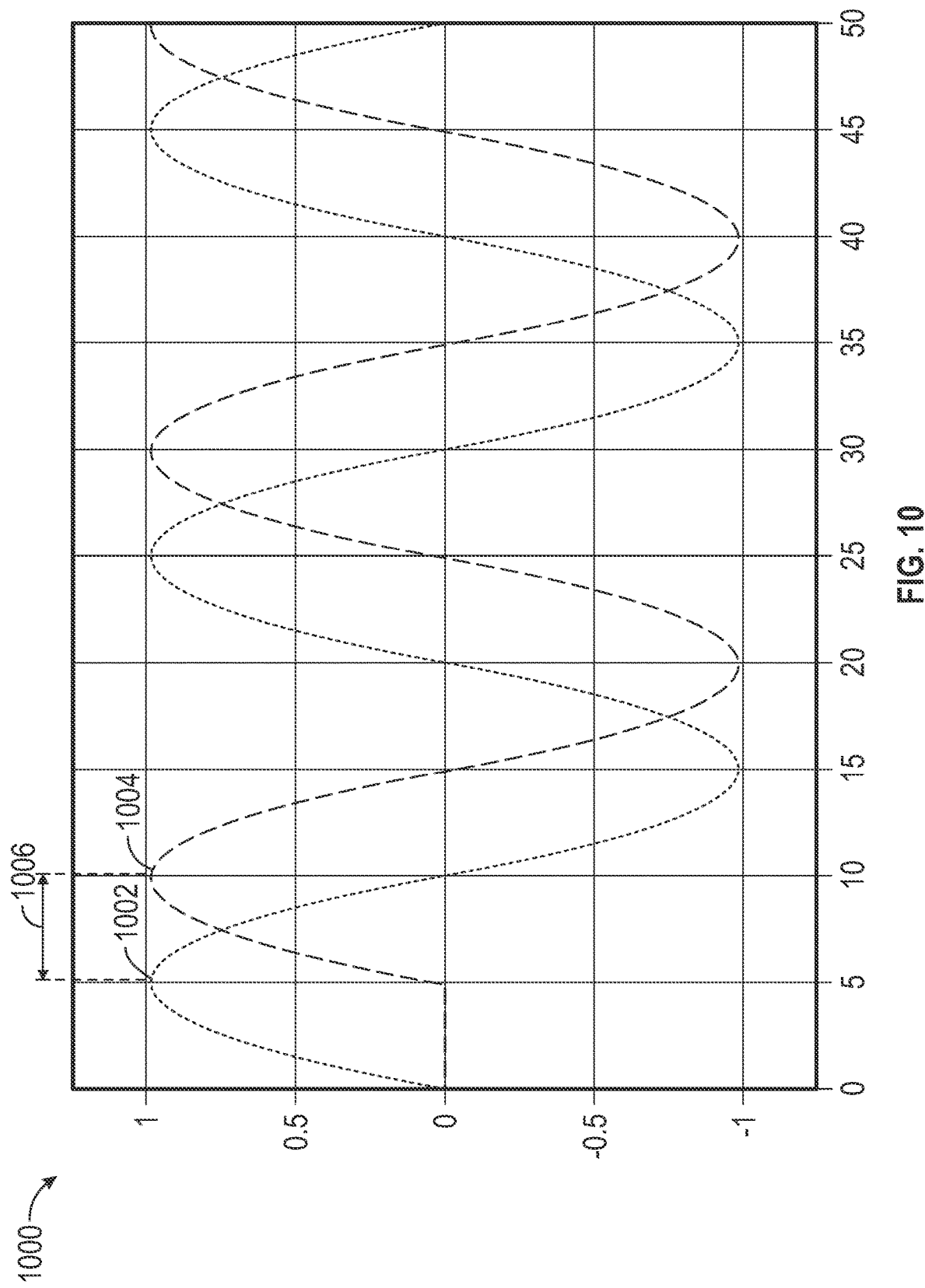
FIG. 10 is a graph illustrating a time delay between a true response and an estimated response of the steering system of the vehicle of FIG. 1, according to an exemplary embodiment.

Referring to FIG. 10, a graph 1000 illustrates a true plant response 1004 relative to a predicted plant response 1002. As shown in graph 1000, the true plant response 1004 is shifted a time delay 1006 relative to the predicted plant response 1002. In some embodiments, the true plant response 1004 illustrates the response (e.g., the actual curvature or the GNSS curvature) of the vehicle 10 responsive to receiving a commanded curvature or a commanded input. In some embodiments, the estimated response 1002 illustrates the response provided by the model of the vehicle (e.g., the model obtained by performing process 800). The process described in detail above with reference to FIG. 9 generally performs the steps of generating the true plant response 1004 and the predicted plant response 1002, and shifting the predicted plant response 1002 while determining a correlation or error between the predicted plant response 1002 and the true plant response 1004. Once the correlation has reached a maximum value or the error has reached a minimum value, the controller 402 identifies that the corresponding amount (e.g., the time delay) by which the predicted response 1002 is shifted is an estimation of the actual time delay of the vehicle 10 (e.g., the steering system 300, the plant time delay 512, etc.) to be used as the internal plant time delay 516 by the Smith Predictor illustrated in FIG. 5.

Control Process

Figure 11:
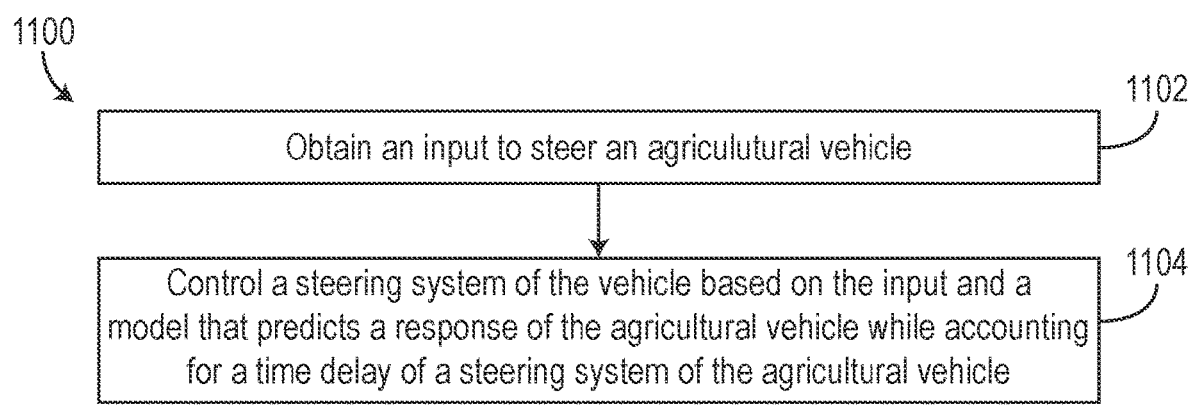
FIG. 11 is a flow diagram of operating the vehicle of FIG. 1 using a model and a time delay estimation to compensate for slop in a steering system of the vehicle of FIG. 1, according to an exemplary embodiment.

Referring to FIG. 11, a flow diagram of a process 1100 for controlling an agricultural vehicle includes steps 1102 and 1104, according to some embodiments. In some embodiments, the process 1100 is performed by the controller 402 based on commanded curvatures of the vehicle 10 (e.g., as provided by a cloud computing or remote system that autonomously controls the vehicle 10) or based on steering wheel inputs of the steering system 300. The process 1100 advantageously facilitates the use of the model of the vehicle 10 generated in process 800 and the time delay identified in process 900. The model of the vehicle 10 and the time delay may be vehicle-specific and compensated for steering slop that is present in the steering system of the vehicle 10. In some embodiments, the process 1100 includes using the Smith Predictor illustrated in FIG. 5.

The process 1100 includes obtaining an input to steer and agricultural vehicle (step 1102), according to some embodiments. In some embodiments, step 1102 includes obtaining a commanded curvature of the agricultural vehicle (e.g., a commanded curvature to make a 90 degree turn, a 180 degree turn at the end of a row, etc.). In some embodiments, the input includes a steering wheel angle, indicating a time series of steering wheel turns that should be implemented by an electric control device of the agricultural vehicle. In some embodiments, the input is obtained from a remote system that provides commands to the agricultural vehicle via a wireless transceiver or telematics unit. In some embodiments, the input is provided to the controller 402 of the agricultural vehicle for implementing at the agricultural vehicle. The input may be the commanded curvature of the agricultural vehicle and the controller may convert the commanded curvature of the agricultural vehicle obtained from the remote system into a steering wheel turn or an encoder position such that an actuator of a steering wheel of the agricultural vehicle can be operated to perform the turn and achieve the commanded curvature.

The process 1100 includes controlling a steering system of the vehicle based on the input and a model that predicts a response of the agricultural vehicle while accounting for a time delay of a steering system of the agricultural vehicle (step 1104), according to some embodiments. Step 1104 may be implemented by the controller 402 using the Smith Predictor described in greater detail above with reference to FIG. 5. In some embodiments, step 1104 includes converting the input from a commanded curvature to a steering input or to a degree of rotation of a steering wheel that can be implemented by an actuator of the steering wheel of the steering system 300 (e.g., the steering control device 304). In some embodiments, step 1104 includes using the model generated by performing process 800 and the time delay that is identified by performing process 900 in order to control the steering system of the agricultural vehicle to account for time delays in the steering system of the agricultural vehicle. In some embodiments, in response to performing step 1104, the process 1100 returns to step 1102. Step 1104 may include using the Smith Predictor as described in greater detail above with reference to FIG. 5 to control the agricultural vehicle in order to minimize deleterious control impacts of time delays or slop in the steering system 300 and to improve steering and control accuracy of the agricultural vehicle.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," or "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen, and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The terms "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, a code that creates an execution environment for the computer program in question (e.g., a code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing, and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments are illustrative only. Additionally, any element disclosed in one embodiment may be incorporated or utilized with any other embodiment disclosed herein.

What is claimed is:

1. An agricultural vehicle comprising:
a steering system configured to operate to steer the agricultural vehicle to perform a turn, the steering system comprising a steering column; and
processing circuitry configured to:
obtain an input indicating a specific turn to be performed by the steering system; and
control the steering system of the agricultural vehicle to implement the specific turn based on the input and a model of the steering system of the agricultural vehicle while accounting for a time delay of the steering system due to steering slop of the steering system.

2. The agricultural vehicle of claim 1, wherein controlling the steering system of the agricultural vehicle comprises using a Smith Predictor that includes the model of the steering system and an estimation of the time delay of the steering system to generate controls for the steering system.

3. The agricultural vehicle of claim 1, wherein the model of the steering system and an estimation of the time delay of the steering system are both vehicle-specific for the agricultural vehicle, the estimation of the time delay of the steering system used to control the steering system such that the time delay of the steering system is accounted for.

4. The agricultural vehicle of claim 1, wherein the input comprises a commanded curvature of the agricultural vehicle or a steering wheel adjustment of a steering wheel of the steering system.

5. The agricultural vehicle of claim 4, wherein the input is received from a remote control system and the agricultural vehicle is an unmanned or autonomously controlled agricultural vehicle.

6. The agricultural vehicle of claim 1, wherein:
the time delay of the steering system is accounted for by using an estimated time delay of the steering system of the agricultural vehicle, the estimated time delay of the steering system of the agricultural vehicle generated based on a recursive regression between a true response curvature of the agricultural vehicle and a predicted response curvature of the agricultural vehicle output by the model; and
the model of the steering system of the agricultural vehicle is generated based on time series data of a curvature of the agricultural vehicle, a yaw rate of the agricultural vehicle, a commanded curvature of the agricultural vehicle, and a forward velocity of the agricultural vehicle.

7. The agricultural vehicle of claim 1, wherein the steering system comprises an electric steering system configured to be operated by the processing circuitry to turn a steering wheel of the steering system.

8. A control system for an agricultural vehicle, the control system comprising:
processing circuitry configured to:
obtain an input indicating a specific turn to be performed by a steering system of the agricultural vehicle; and
control the steering system of the agricultural vehicle to implement the specific turn based on the input and a model of the steering system of the agricultural vehicle while accounting for a time delay of the steering system due to slop in a steering column of the steering system.

9. The control system of claim 8, wherein controlling the steering system of the agricultural vehicle comprises using a Smith Predictor that includes the model of the steering system and an estimation of the time delay of the steering system to generate controls for the steering system.

10. The control system of claim 8, wherein the model of the steering system and an estimation of the time delay of the steering system are both vehicle-specific for the agricultural vehicle, the estimation of the time delay of the steering system used to control the steering system such that the time delay of the steering system is accounted for.

11. The control system of claim 8, wherein the input comprises a commanded curvature of the agricultural vehicle or a steering wheel adjustment of a steering wheel of the steering system.

12. The control system of claim 11, wherein the input is received from a remote control system and the agricultural vehicle is an unmanned or autonomously controlled agricultural vehicle.

13. The control system of claim 8, wherein:
the time delay of the steering system is accounted for by using an estimated time delay of the steering system of the agricultural vehicle, the estimated time delay of the steering system of the agricultural vehicle generated based on a recursive regression between a true response curvature of the agricultural vehicle and a predicted response curvature of the agricultural vehicle output by the model; and
the model of the steering system of the agricultural vehicle is generated based on time series data of a curvature of the agricultural vehicle, a yaw rate of the agricultural vehicle, a commanded curvature of the agricultural vehicle, and a forward velocity of the agricultural vehicle.

14. The control system of claim 8, wherein the steering system comprises an electric steering system configured to be operated by the processing circuitry to turn a steering wheel of the steering system.

15. A method for controlling a steering system of an agricultural vehicle, the method comprising:
obtaining an input indicating a specific turn to be performed by the steering system of the agricultural vehicle; and
controlling the steering system of the agricultural vehicle to implement the specific turn based on the input and a model of the steering system of the agricultural vehicle while accounting for a time delay of the steering system due to slop in a steering column of the steering system.

16. The method of claim 15, wherein controlling the steering system of the agricultural vehicle comprises using a Smith Predictor that includes the model of the steering system and an estimation of the time delay of the steering system to generate controls for the steering system.

17. The method of claim 15, wherein the model of the steering system and an estimation of the time delay of the steering system are both vehicle-specific for the agricultural vehicle, the estimation of the time delay of the steering system used to control the steering system such that the time delay of the steering system is accounted for.

18. The method of claim 15, wherein the input comprises a commanded curvature of the agricultural vehicle or a steering wheel adjustment of a steering wheel of the steering system.

19. The method of claim 18, wherein the input is received from a remote control system and the agricultural vehicle is an unmanned or autonomously controlled agricultural vehicle.

20. The method of claim 15, wherein:
the time delay of the steering system is accounted for by using an estimated time delay of the steering system of the agricultural vehicle, the estimated time delay of the steering system of the agricultural vehicle generated based on a recursive regression between a true response curvature of the agricultural vehicle and a predicted response curvature of the agricultural vehicle output by the model; and
the model of the steering system of the agricultural vehicle is generated based on time series data of a curvature of the agricultural vehicle, a yaw rate of the agricultural vehicle, a commanded curvature of the agricultural vehicle, and a forward velocity of the agricultural vehicle.

\* \* \* \* \*